(12) United States Patent
Davis

(10) Patent No.: US 6,499,752 B1
(45) Date of Patent: Dec. 31, 2002

(54) STEER AXLE ASSEMBLY

(75) Inventor: Mark Alan Davis, Portage, MI (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/633,383

(22) Filed: Aug. 7, 2000

(51) Int. Cl.$^7$ ................................................ B62D 7/18
(52) U.S. Cl. ................................................ 280/93.512
(58) Field of Search .......................... 280/93.512, 93.51, 280/124.15

(56) References Cited

U.S. PATENT DOCUMENTS

| | | | |
|---|---|---|---|
| 803,606 A | | 11/1905 | Law |
| 873,147 A | | 12/1907 | Baldwin |
| 876,704 A | | 1/1908 | Duncan |
| 877,835 A | | 1/1908 | Daniel |
| 1,146,008 A | | 7/1915 | Marmon |
| 1,184,416 A | | 5/1916 | Brush |
| 1,223,469 A | | 4/1917 | Brush |
| 1,471,575 A | * | 10/1923 | Simons ................. 280/93.512 |
| 1,503,511 A | * | 8/1924 | Masury ................. 280/93.512 |
| 1,568,782 A | * | 1/1926 | Swayne ................. 280/93.512 |
| 1,783,614 A | * | 12/1930 | Griswold ............... 280/93.512 |
| 3,342,507 A | * | 9/1967 | Koch et al. ............. 280/93.512 |
| 3,441,288 A | * | 4/1969 | Boughner .............. 280/93.512 |
| 4,761,018 A | * | 8/1988 | Abbruzzi et al. ........... 280/674 |
| 4,798,394 A | | 1/1989 | Pollock et al. ............. 280/96.1 |
| 4,878,683 A | * | 11/1989 | Dever ...................... 280/96.1 |
| 5,219,176 A | | 6/1993 | Mitchell ................... 280/96.1 |
| 5,350,183 A | | 9/1994 | Shealy ..................... 280/96.1 |
| 5,366,300 A | * | 11/1994 | Deane et al. ............... 384/585 |
| 5,413,365 A | * | 5/1995 | Bodin et al. ............... 280/96.1 |
| 5,429,423 A | | 7/1995 | Pollock et al. ............ 301/124.1 |
| 5,624,011 A | | 4/1997 | White et al. ................ 188/329 |
| 5,722,784 A | | 3/1998 | Link ........................ 403/158 |
| 5,975,547 A | * | 11/1999 | Stroh et al. ............. 280/93.512 |
| 6,029,986 A | * | 2/2000 | Bodin et al. ........... 280/93.512 |
| 6,071,032 A | | 6/2000 | Link .......................... 403/158 |
| 6,186,525 B1 | * | 2/2001 | Bodin .................... 280/93.512 |
| 6,217,046 B1 | * | 4/2001 | Bodin et al. ........... 280/93.512 |

FOREIGN PATENT DOCUMENTS

WO    WO 98/45158    10/1998

OTHER PUBLICATIONS

Technical Data Sheets E–1460I, Eaton Corp., 3 pages.
Eaton Truck Components Bulletin AXIB–9406 4 page (1994).
"Integral Arm Axle Beams" Dana Corp. 1 page.
"1200I Steer Axle," Dana Corp. 1 page (1997).
"Steer Axle Models–Integral Air Disc Brake," Dana Corp. 1 page.

* cited by examiner

Primary Examiner—Paul N. Dickson
Assistant Examiner—Deanna Draper
(74) Attorney, Agent, or Firm—Dykema Gossett PLLC

(57) ABSTRACT

A steer axle assembly in accordance with the present invention includes an axle beam defining a first boss with a first bore. The assembly further includes a knuckle body that defines a second boss. The second boss is in the form of a unitary sleeve from which a tie rod arm and steering arm extend. The second boss includes a second bore. The assembly further includes a set of bearings disposed in one of the first and second bores. In one embodiment of the invention, the bearings are disposed in the axle beam bore. In another embodiment of the invention, the bearings are disposed in the bore defined by the knuckle body. The assembly finally includes a kingpin. The kingpin is rotatably received within the bore having the bearings and is rigidly coupled within the bore that does not include the bearings. The kingpin may be tightened to its required specification via the use of a washer and nut on one end of the kingpin.

20 Claims, 4 Drawing Sheets

STEER AXLE ASSEMBLY

BACKGROUND OF THE INVENTION

1. Technical Field

This invention relates to steer axle assemblies and more particularly to a two boss steer axle assembly incorporating bearings to allow rotation of the kingpin.

2. Discussion of the Background Art

In a conventional steer axle assembly, a steering knuckle provides a spindle or bearing support for a wheel hub, bearings and wheel assembly. The steering knuckle is coupled to the steer axle using a kingpin. Typically, the steering knuckle has a forked yoke that defines first and second bosses with aligned bores. The yoke surrounds one end of the steer axle which defines a third boss having another bore aligned with the bores of the knuckle yoke. The kingpin extends through one of the knuckle bores, through the axle bore, and through the remaining knuckle bore to couple the knuckle and steer axle together.

In these conventional steer axle assemblies, the kingpin is fixedly coupled to the axle boss such that the kingpin does not rotate in relation to the axle boss. The knuckle pivots about the kingpin on a vertical steering axis. Typically, bushings are disposed within the aligned bores of the knuckle to allow the knuckle to rotate relative to the kingpin.

Conventional steer axle assemblies suffer from several disadvantages. First, conventional steer axle assemblies allow a relatively large amount of axial and radial movement of the kingpin. As a result of this axial and radial movement, the kingpin joints are subject to greater wear, thereby creating greater clearances and permitting the kingpin to shift and oscillate within the knuckle bores and reducing the useful lives of the assembly components. In order to limit axial and radial movement of the kingpin, shimming and precision machining of the steer axle assembly members are often required. Second, the use of a knuckle having a yoke (i.e., two bosses): (i) requires a relatively large number of seals; (ii) increases tooling, manufacturing, and assembly costs due to the relatively complex design; (iii) minimizes the ability to adjust the drop of the steer axle from the spindle; (iv) increases the size and weight of the assembly; and (v) prevents a predictable and relatively narrow tolerance range of bearing pre-load/endplay because assembly and vehicle loading causes deflection of bearings disposed within the bosses. Third, the use of bushings in conventional steer axle assemblies results in relatively large tolerances and often requires broaching or reaming of the bushings.

There is thus a need for a steer axle assembly that will minimize or eliminate one or more of the above-mentioned deficiencies.

SUMMARY OF THE INVENTION

The present invention provides a steer axle assembly.

A steer axle assembly in accordance with the present invention includes an axle beam defining a first boss with a first bore. The assembly further includes a knuckle having a body that defines only a second boss as compared to the conventional knuckle that defines second and third bosses. The second boss is in the form of a unitary sleeve from which a tie rod arm and steering arm extend. The second boss includes a second bore. The assembly further includes a set of bearings disposed in one of the first and second bores. In one embodiment of the invention, the bearings are disposed in the axle beam bore. In another embodiment of the invention, the bearings are disposed in the bore defined by the knuckle body. The assembly finally includes a kingpin. The kingpin is rotatably received within the bore having the bearings and is rigidly coupled within the bore that does not include the bearings. The kingpin may be tightened to its required specification via the use of a washer and nut on one end of the kingpin.

A steer axle assembly in accordance with the present invention represents a significant improvement as compared to conventional steer axle assemblies. First, axial and radial movement of the kingpin is diminished because such movement can be easily and consistently monitored and adjusted—without shimming or precision machining. Second, the two boss system of the inventive assembly provides for a simplified knuckle design and manufacture. The use of two bosses as opposed to three also provides: (i) improved life of the joint because of the decrease in the number of seals and necessary adjustments; (ii) decreased tooling, manufacturing and assembly costs; (iii) the ability to easily change the kingpin length and/or spacer size to change the drop in the axle beam thereby reducing the need for multiple gooseneck beam forgings with different gooseneck drops from the spindle to the beam spring pad or center section; (iv) a reduction in the overall size and weight of the assembly with the ability to accommodate a variety of brake styles and positions; (v) the ability to obtain a predictable and narrow tolerance range or bearing pre-load/endplay; and (vi) the ability to use structural steel of various cross-sections in addition to forged beams. Finally, the use of bearings, as opposed to bushings, within the boss bores provides: (i) the ability to obtain finer tolerances; (ii) a reduction in the variation in joint movement; and (iii) lower maintenance and manufacturing costs.

These and other features and objects of this invention will become apparent to one skilled in the art from the following detailed description and the accompanying drawings illustrating features of this invention by way of example.

DETAILED DESCRIPTION OF THE PREFERRED EMBODIMENTS

Figure 1:
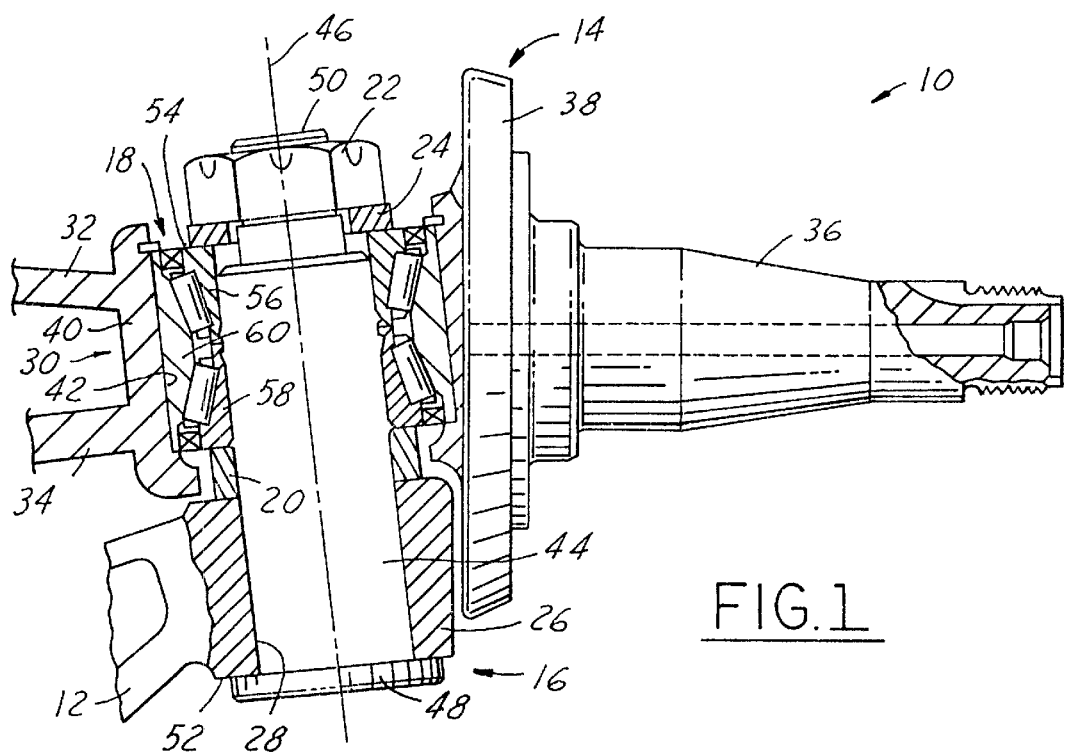
FIG. 1 is a sectional and elevational view of a steer axle assembly in accordance with a first embodiment of the present invention.

Referring now to the drawings wherein like reference numerals are used to identify identical components in the various views, FIG. 1 illustrates a steer axle assembly 10 in accordance with a first embodiment of the present invention. Assembly 10 is configured for use in large trucks, but may find application in a wide variety of vehicles. In accordance with the present invention, assembly 10 includes an axle beam 12, a knuckle 14, a kingpin 16, and a set of bearings 18. Assembly 10 may also include a spacer 20, a nut 22, and a washer 24.

Axle beam 12 is provided to support a vehicle (not shown) on wheels (not shown) disposed proximate either end of beam 12. Beam 12 may be made be from steel and may be forged or fabricated. Each end (only one of which is shown in FIG. 1) of beam 12 defines a first boss 26. In the illustrated embodiment, boss 26 forms the lower boss (i.e., the boss that is closer to ground) of the two-boss assembly 10. This construction facilities the use of straight beams made of structural steel of various cross-sections in addition to conventional forged I-beams (generally having a gooseneck) because the drop of the axle beam may be varied through the size of kingpin 16 and/or spacer 20 rather than the axle beam as described hereinbelow. Boss 26 includes a bore 28 extending generally vertically and substantially perpendicular to the longitudinal axis of beam 12. Bore 28 is configured to receive kingpin 16.

Knuckle 14 is provided for mounting of a wheel (not shown) of the vehicle and for connecting axle beam 12 and the steering components of the vehicle. Knuckle 14 may be made from steel and may be forged or fabricated. Knuckle may include a body 30, steering and tie-rod arms 32, 34, a spindle 36, and a brake mounting plate 38.

Body 30 provides structural support for the other components of knuckle 14 and defines a second boss 40 for receipt of kingpin 16. Boss 40 is in the form of a unitary sleeve from which steering and tie-rod arms 32, 34 extend and includes a bore 42 configured to receive kingpin 16. The angle of axle bore 28 and knuckle bore 42 are such to position kingpin 16 generally vertically, preferably at some angle inboard from a vertical position to assist steering.

Arms 32, 34 are provided to couple knuckle 14 to the steering mechanism of the vehicle and to a support rod (not shown) extending generally parallel to beam 12. Arms 32, 34 are conventional in the art and—as illustrated in FIG. 1—may be integral with body 30. Alternatively, arms 32, 34 may be bolted onto body 30 or connected via a tapered fist or other conventional arrangement. In the case wherein arms 32, 34 are made integral with body 30, arms 32, 34 may initially extend in a direction parallel to spindle 36 as knuckle 14 is formed and then be urged into their respective final positions.

Spindle 36 is provided to mount a wheel (not shown) of a vehicle on wheel bearings (not shown). Spindle is conventional in the art and may be formed integral with body 30.

Braking mounting plate 38 is provided to support a brake (not shown) for a wheel. Plate 38 may be integral with body 30 of knuckle 14 or may be attached to knuckle 14 in a variety of conventional ways. The inventive assembly 10 facilitates the use of a wide variety of brakes. For example, plate 38 may comprise a conventional round flange. Alternatively plate 38 may be formed so as to receive various air disc or hydraulic brakes.

Figure 2:
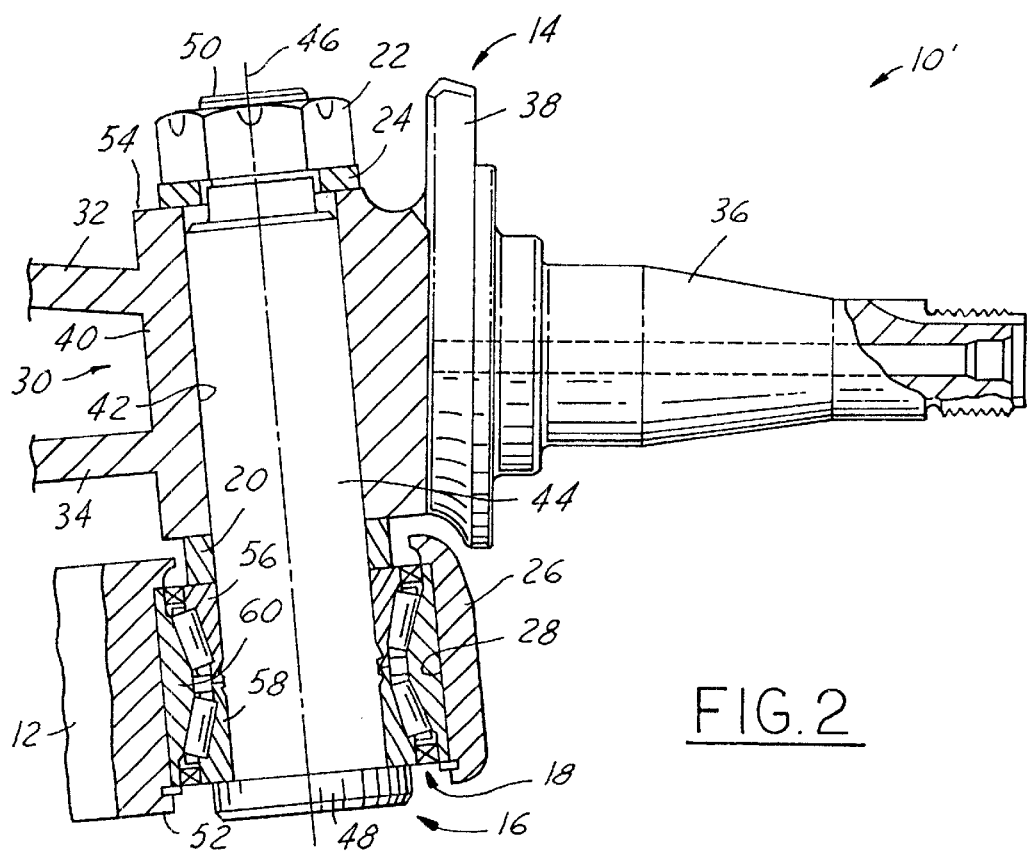
FIG. 2 is a sectional and elevational view of a steer axle assembly in accordance with a second embodiment of the present invention.

Kingpin 16 is provided to couple knuckle 14 to beam 12. Kingpin 16 may be made from steel or other conventional metals or metal alloys. Kingpin 16 has a first portion rotatably supported by bearings 18 within bore 42 of knuckle body 30 and a second portion fixedly coupled within bore 28 of beam 12. Referring to FIG. 2, in a steer axle assembly 10' in accordance with a second embodiment of the present invention, kingpin 16 has a first portion rotatably supported by bearings 18 within bore 28 of beam 12 and a second portion fixedly coupled within bore 42 of knuckle body 30. Kingpin 16 may be fixedly coupled within bore 28 of beam 12 (or bore 42 of knuckle body 30 in the case of assembly 10') in a conventional manner through the use of one or more drawkeys.

Figure 3:
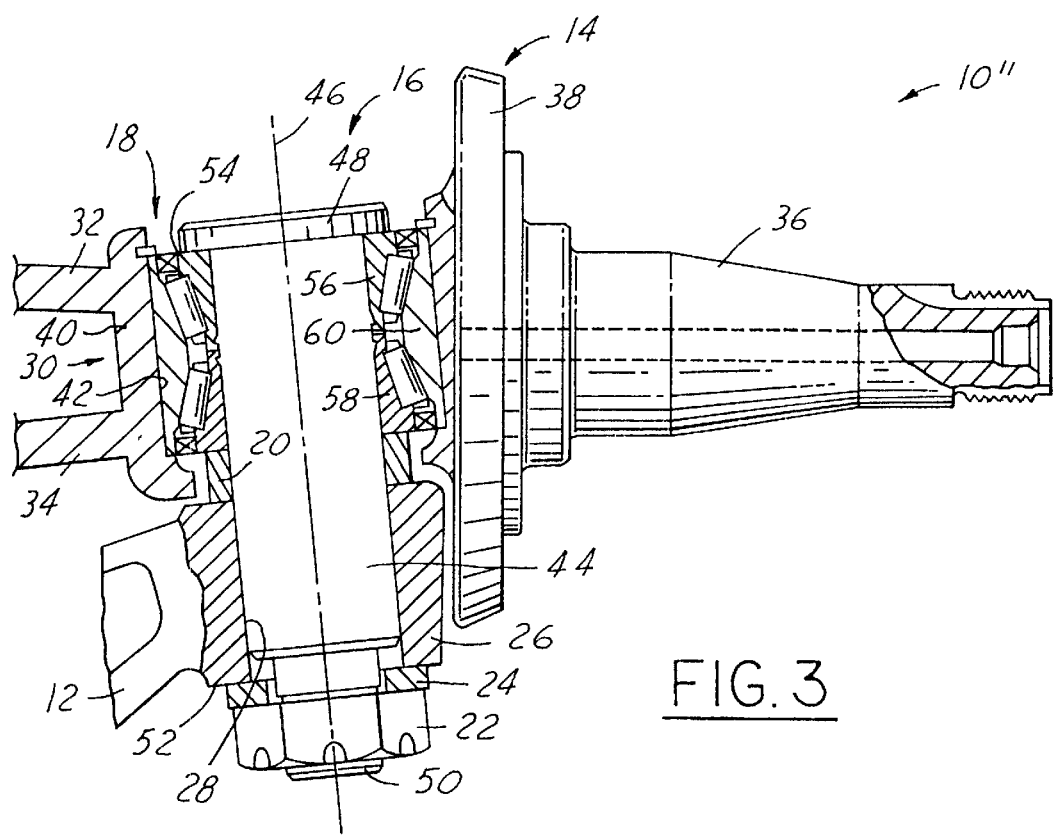
FIG. 3 is a sectional and elevational view of a steer axle assembly in accordance with the first embodiment of the present invention illustrating a different configuration for the kingpin.

Referring again to FIG. 1, kingpin 16 has a longitudinal body 44 disposed about an axis 46 with a first axial end defining an end flange 48 and a second axial end defining a partially threaded shank 50. Flange 48 extends radially outwardly from body 44 and is disposed against beam 12 adjacent the end 52 of bore 28 closest to ground. Shank 50 extends from body 44 in the direction of axis 46 and has a diameter that is less than the diameter of body 44. Shank 50 extends outwardly from end 54 of bore 42 of knuckle body 30. Referring to FIG. 3, in an alternate embodiment of a steer axle assembly 10" in accordance with the present invention, flange 48 may be disposed against bearings 18 adjacent end 54 of bore 42 and shank 50 may extend outwardly from end 52 of bore 28 of beam 12.

Bearings 18 are provided to allow relative rotation between kingpin 16 and either knuckle 14 (in assembly 10) or beam 12 (in assembly 10'). In the case of assembly 10'—where bearings 18 are disposed in the lower boss 26 (i.e., the boss that is closer to ground)—bearings 18 may comprise conventional wheel bearings because the short distance between bearings 18 and ground as compared to conventional steer axle assemblies reduces the load required during braking of the vehicle. Bearings 18 may take on a variety of forms. Referring to FIG. 1, bearings 18 may comprise a unitized or cartridge bearings sold under the trademark "UNIPAC" by Timken Corp. Bearings 18 include first and second bearing cones 56, 58 with cones 56, 58 adjacent to one another. Cones 56, 58 form inner bearing races and provide a bearing surface for kingpin 16. Bearings 18 further include a unitary bearing cup 60 disposed radially outwardly of both cone 56 and cone 58 and forming a pair of outer bearing races. Cup 60 is sized so as to be received within bore 42 of knuckle body 30 (or, bore 28 of beam 12 in the case of assembly 10' in FIG. 2). Alternatively, cup 60 may be made integral with knuckle body 30.

Figure 4:
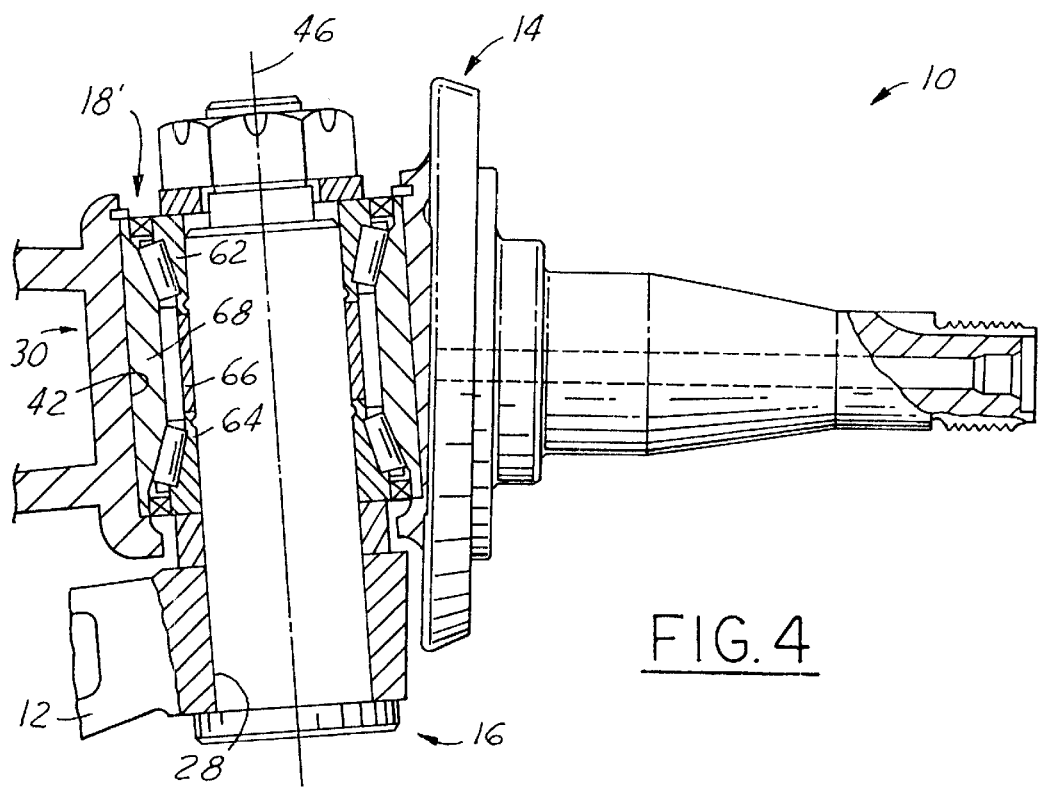
FIGS. 4–7 are sectional and elevational views of a steer axle assembly in accordance with the first embodiment of the present invention illustrating the use of various bearing configurations.

Referring to FIG. 4, another alternative set of bearings 18' for use within the inventive steer axle assemblies is illustrated. Bearing set 18' may comprise a wide-spread version of the unitized or cartridge bearings illustrated in FIG. 1. Bearing set 18' includes first and second bearing cones 62, 64 separated by a spacer 66. Cones 62, 64 form inner bearing races and provide a bearing surface for kingpin 16. Bearings 18' further include a unitary bearing cup 68 disposed radially outwardly of both cone 62 and cone 64 and spacer 66 and forming a pair of outer bearing races. Cup 68 is sized so as to be received within bore 42 of knuckle body 30 (or, bore 28 of beam 12 in the case of assembly 10' in FIG. 2). Alternatively, cup 68 may be made integral with knuckle body 30.

Figure 5:
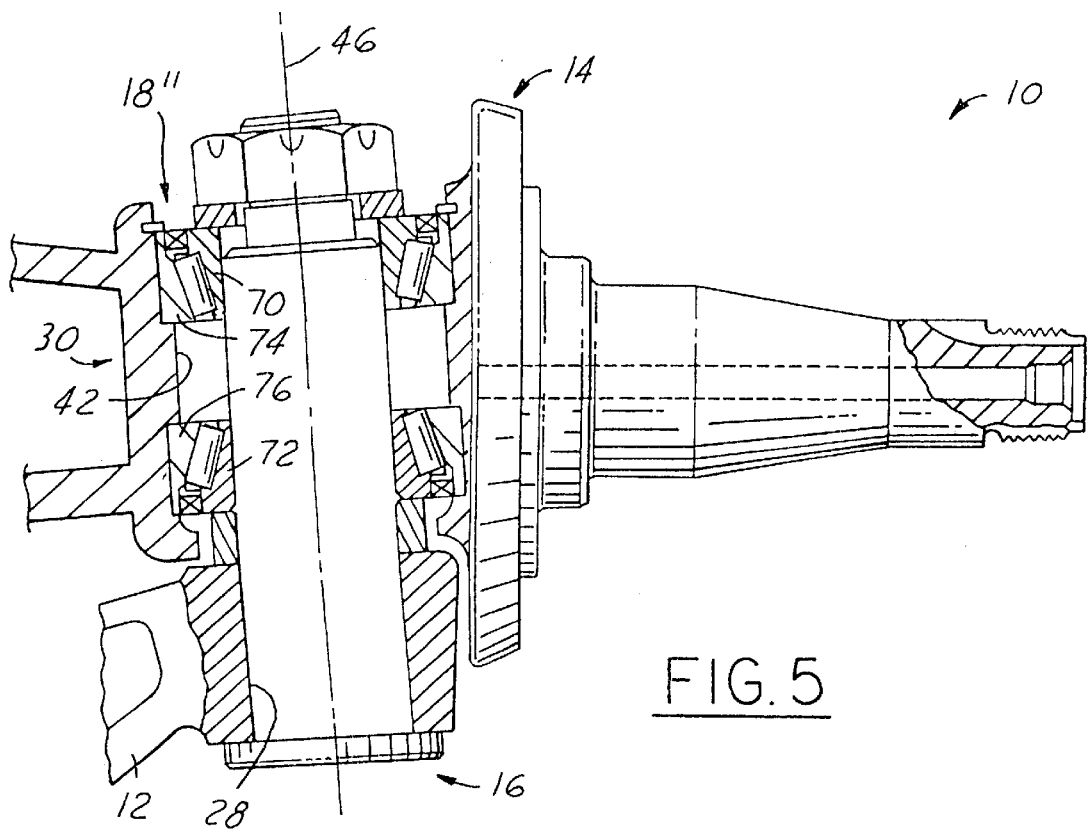

Referring to FIG. 5, an alternative set of bearings 18" for use within the inventive steer axle assemblies is illustrated. Bearing set 18" may comprise the manually adjusted bearings having model number 2T-S and manufactured by Timken Corp. Bearings 18" include first and second bearing cones 70, 72 that are separated from one another along axis 46. Cones 70, 72 form inner bearing races and provide a bearing surface for kingpin 16. Bearings 18" further include bearing cups 74, 76 disposed radially outwardly of cones 70, 72, respectively and forming a pair of corresponding outer bearing races. Cups 74, 76 are sized so as to be received within bore 42 of knuckle body 30 (or, bore 28 of beam 12 in the case of assembly 10' in FIG. 2).

Figure 6:
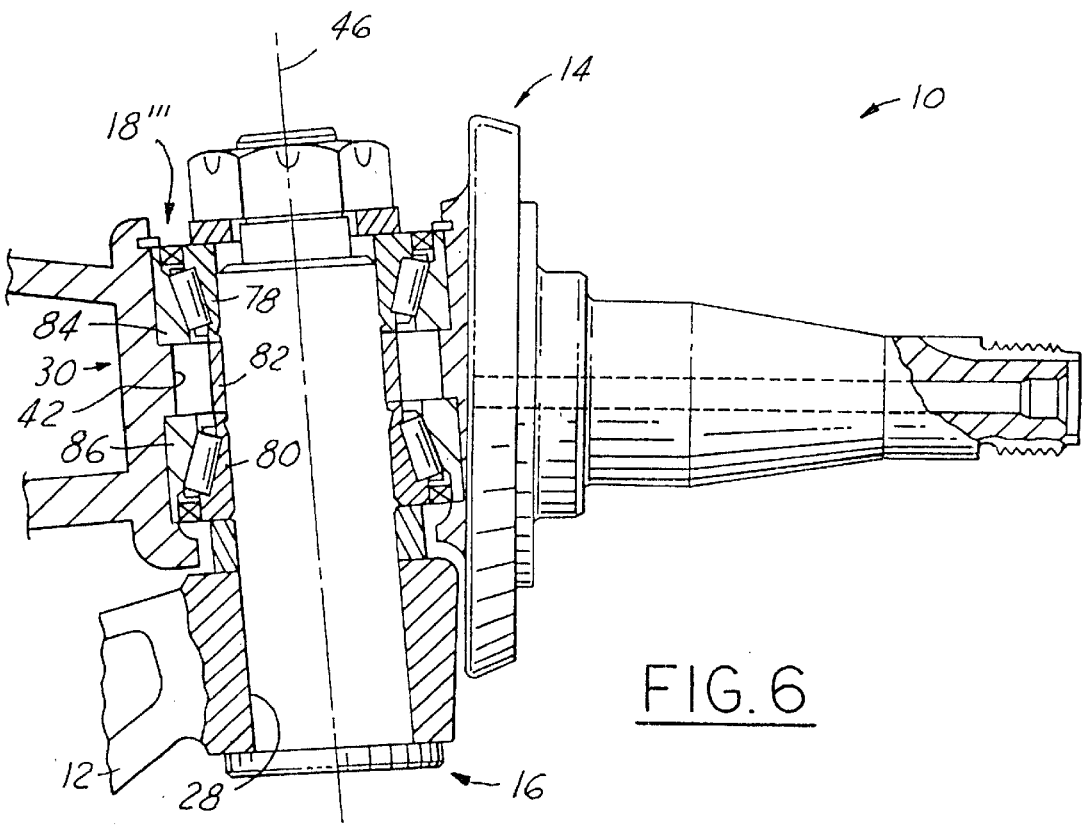

Referring to FIG. 6, yet another alternative set of bearings 18'" for use within the inventive steer axle assemblies is illustrated. Bearing set 18'" may comprise the pre-set bearings having model number 2T-S and manufactured by Timken Corp. Bearing set 18''' includes first and second bearing cones 78, 80 that are separated from one another along axis 46. A spacer 82 is disposed between cones 78, 80. Cones 78, 80 form inner bearing races and provide a bearing surface for kingpin 16. Bearings 18''' further include bearing cups 84, 86 disposed radially outwardly of cones 78, 80, respectively and forming a pair of corresponding outer bearing races. Cups 84, 86 are sized so as to be received within bore 42 of knuckle body 30 (or, bore 28 of beam 12 in the case of assembly 10' in FIG. 2).

Figure 7:
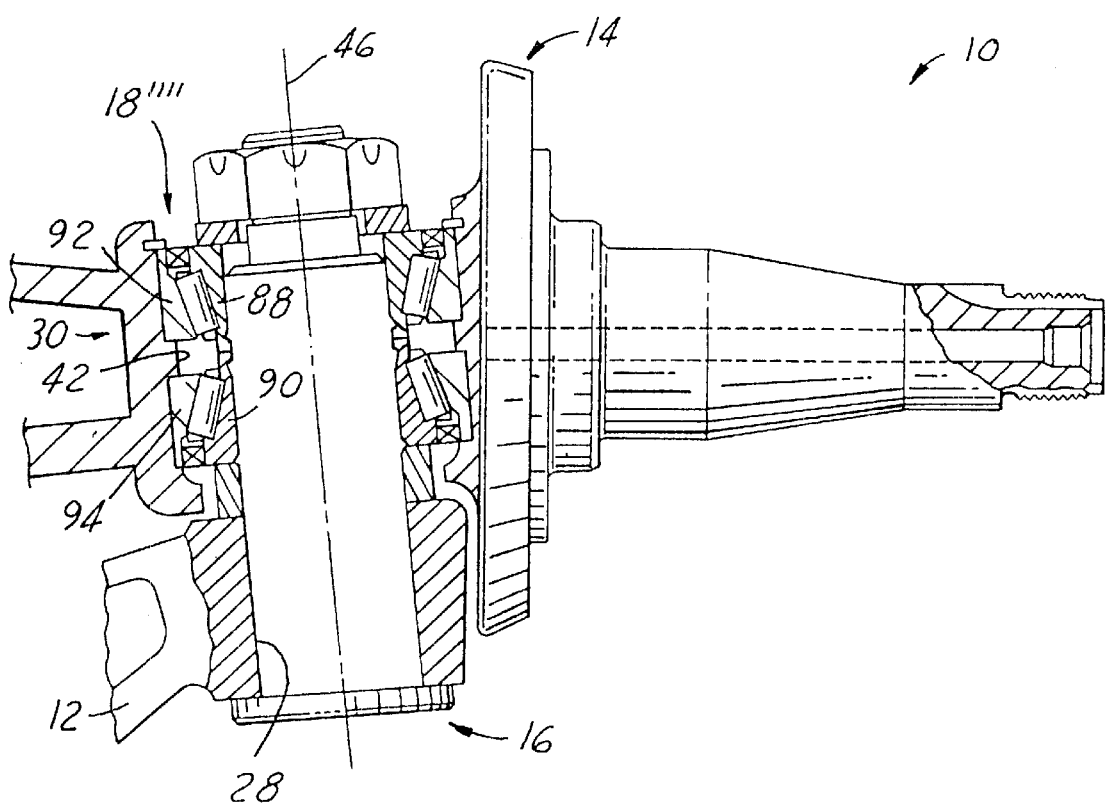

Referring to FIG. 7, yet another alternative set of bearings 18'''' for use within the inventive steer axle assemblies is illustrated. Bearing set 18'''' may comprise the bearings sold under the trademark "WHEELPAC" by Timken Corp. Bearing set 18'''' includes first and second bearing cones 88, 90 with cones 88, 90 adjacent to one another. Cones 88, 90 form inner bearing races and provide a bearing surface for kingpin 16. Bearing set 18'''' further includes bearing cups 92, 94 disposed radially outwardly of cones 88, 90, respectively and forming a pair of corresponding outer bearing races. Cups 92, 94 are sized so as to be received within bore 42 of knuckle body 30 (or, bore 28 of beam 12 in the case of assembly 10' in FIG. 2). Although FIGS. 4–7 illustrate various bearing sets disposed within bore 42 of knuckle body 30, it should be readily understood by those of skill in the art that the illustrated bearings could alternatively be disposed in bore 28 of beam 12 as illustrated in FIG. 2.

Referring again to FIG. 1, spacer 20 is provided to maintain a predetermined distance between beam 12 and knuckle 14. Spacer 20 is conventional in the art and may be made from conventional metals or other solid materials. Spacer 20 is annular and the inner diameter is sized to receive kingpin 16. One side of spacer 20 is configured to engage bearings 18. An opposite side of spacer 20 is configured to engage beam 12 (or knuckle body 30 in the case of assembly 10' in FIG. 2). The axial length of spacer 20 may be varied in order to vary the drop of beam 12.

Nut 22 and washer 24 are provided to enable the application of an initial bearing pre-load to the kingpin joint. Nut 22 and washer 24 may be made from conventional metals and are sized to receive shank 50 of kingpin 16. Nut 22 and washer 24 may be combined into a one-piece flanged nut. Washer 24 is disposed about an unthreaded portion of shank 50. Turning nut 22 produces a predefined bearing pre-load acting through washer 24, bearings 18 (which may comprise one or more bearing cones and/or spacers depending upon the bearing set used), spacer 20, beam 12 (or knuckle body 30 in the case of assembly 10' in FIG. 2) and end flange 48. As set forth hereinabove, in each of the bearings 18, 18', 18'', 18''', 18'''' disclosed herein, both bearing rows are disposed within a single boss 40 of knuckle 14 (or boss 26 of beam 12 in the case of assembly 10'). As a result, a predictable and narrow tolerance range of bearing pre-load/end play can be obtained by tightening nut 22. In a conventional three-boss steer axle assembly, the bearing rows are disposed in separate bosses on the knuckle body and deflection occurs during assembly and under vehicle static and dynamic load thereby precluding the ability to obtain and retain narrow tolerances. Nut 22 and washer 24 may be disposed within an enclosure cap (not shown) coupled to knuckle 14.

As described and illustrated hereinabove, a steer axle assembly in accordance with the present invention represents a significant improvement as compared to conventional steer axle assemblies. First, the arrangement allows easy application of an initial bearing pre-load by tightening nut 22. As a result, axial and radial movement of kingpin 16 is reduced without shimming or precision machining. Second, the single boss knuckle 14: (i) improves the life of the kingpin joint because only a single set of seals are needed; (ii) decreases tooling, manufacturing and assembly costs because of the simple design of the knuckle; (iii) enables a relatively easy adjustment of the axle beam drop through variation in the length of the kingpin 16 and/or spacer 20 thereby reducing or eliminating the need to have multiple beam forgings with different gooseneck drops from the spindle to the spring pad or center section of beam 12; (iv) reduces the overall size and weight of the assembly; (v) accommodates a variety of brake styles and positions; (vi) provides the ability to obtain a predictable and narrow tolerance range of bearing pre-load/endplay; and (vii) facilitates the use of structural steel beams of various cross-sections in addition to forged beams. Finally, the use of bearings 18, as opposed to bushings, within the boss bores 28, 42 provides: (i) the ability to obtain finer tolerances; (ii) a reduction in the variation in joint movement; and (iii) lower maintenance and manufacturing costs.

It is to be understood that the above description is merely exemplary rather than limiting in nature, the invention being limited only by the appended claims. Various modifications and changes may be made thereto by one of ordinary skill in the art which embody the principles of the invention and fall within the spirit and scope thereof.

I claim:

1. A steer axle assembly, comprising:
    a steer axle beam defining a first boss, said first boss having a first bore;
    a knuckle having a body from which a steering arm and a tie rod arm extend, said body disposed on only one side of said axle beam and defining a second boss having a second bore;
    a set of bearings disposed within one of said first and second bores; and,
    a kingpin having a first portion supported by said bearings in said one bore and a second portion fixedly coupled within another of said first and second bores.

2. The assembly of claim 1 wherein said set of bearings includes first and second bearing cones and a spacer disposed between said first and second bearing cones.

3. The assembly of claim 1 wherein said set of bearings includes first and second bearing cones and a unitary bearing cup disposed radially outwardly of said first and second bearing cones.

4. The assembly of claim 1 wherein said set of bearings includes first and second bearing cones adjacent one another.

5. A steer axle assembly, comprising:
    a steer axle beam defining a first boss, said first boss having a first bore;
    a knuckle having a body from which a steering arm and a tie rod arm extend, said body disposed on only one side of said axle beam and defining a second boss having a second bore;
    a set of bearings disposed within said first bore; and,
    a kingpin having a first portion supported by said bearings in said first bore and a second portion fixedly coupled within said second bore.

6. The assembly of claim 5 wherein said bearings include first and second bearing cones and a spacer disposed between said first and second bearing cones.

7. The assembly of claim 5 wherein said set of bearings includes first and second bearing cones and a unitary bearing cup disposed radially outwardly of said first and second bearing cones.

8. The assembly of claim 5 wherein said set of bearings includes first and second bearing cones adjacent one another.

9. The assembly of claim 5, further comprising a spacer disposed between said bearings and said knuckle.

10. The assembly of claim 5, further comprising:

a nut; and, a washer wherein said kingpin includes a first end defining a flange and a second end defining a shank and said nut and said washer are disposed about said shank.

11. The assembly of claim 10 wherein said flange is disposed against said knuckle and said washer is disposed against said bearings.

12. The assembly of claim 10 wherein said flange is disposed against bearings and said washer is disposed against said knuckle.

13. A steer axle assembly, comprising:

a steer axle beam defining a first boss, said first boss having a first bore;

a knuckle having a body from which a steering arm and a tie rod arm extend, said body disposed on only one side of said axle beam and defining a second boss having a second bore;

a set of bearings disposed within said second bore; and, a kingpin having a first portion supported by said bearings in said second bore and a second portion fixedly coupled within said first bore.

14. The assembly of claim 13 wherein said bearings include first and second bearing cones and a spacer disposed between said first and second bearing cones.

15. The assembly of claim 13 wherein said set of bearings includes first and second bearing cones and a unitary bearing cup disposed radially outwardly of said first and second bearing cones.

16. The assembly of claim 13 wherein said set of bearings includes first and second bearing cones adjacent one another.

17. The assembly of claim 13, further comprising a spacer disposed between said bearings and said axle beam.

18. The assembly of claim 13, further comprising:

a nut; and, a washer wherein said kingpin includes a first end defining a flange and a second end defining a shank and said nut and said washer are disposed about said shank.

19. The assembly of claim 18 wherein said flange is disposed against said axle beam and said washer is disposed against said bearings.

20. The assembly of claim 18 wherein said flange is disposed against bearings and said washer is disposed against said axle beam.

* * * * *